No. 612,879. Patented Oct. 25, 1898.
W. SOBEY.
BALL BEARING.
(Application filed Aug. 5, 1897.)
(No Model.)
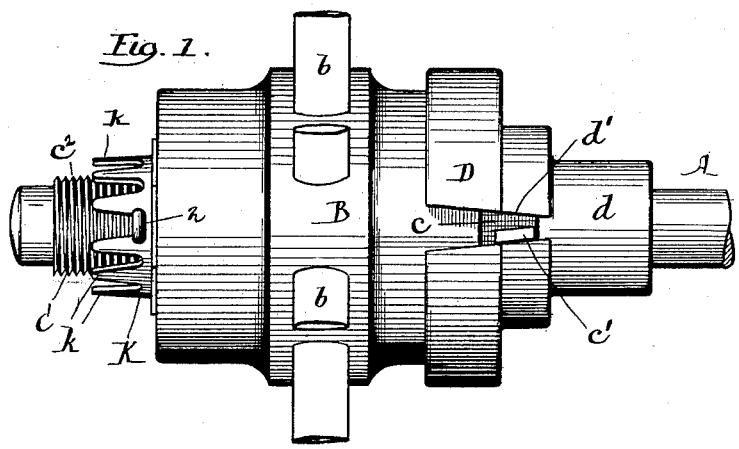
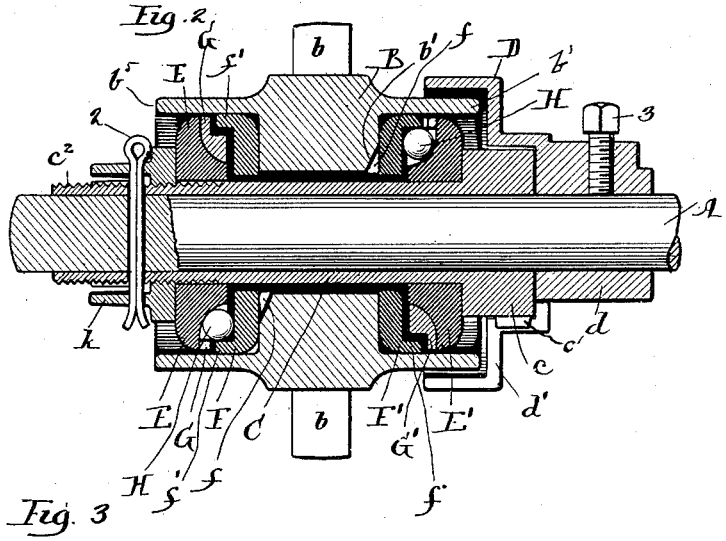
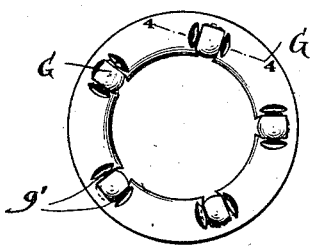
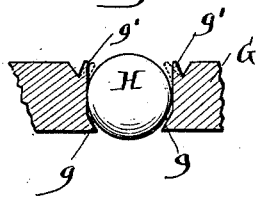
Witnesses:
Fred Gerlach
Inventor:
Wm Sobey
By his Attorneys

UNITED STATES PATENT OFFICE.

WILLIAM SOBEY, OF RACINE, WISCONSIN, ASSIGNOR TO THE J. I. CASE PLOW WORKS, OF SAME PLACE.

BALL-BEARING.

SPECIFICATION forming part of Letters Patent No. 612,879, dated October 25, 1898.

Application filed August 5, 1897. Serial No. 647,158. (No model.)

*To all whom it may concern:*

Be it known that I, WILLIAM SOBEY, a resident of the city of Racine, in the county of Racine, State of Wisconsin, have invented certain new and useful Improvements in Ball-Bearings for Vehicle-Wheels, of which I do declare the following to be a full, clear, and exact description, reference being had to the accompanying drawings, forming a part of this specification.

The present invention has for its object to provide a simple, cheap, durable, and effective construction of ball-bearings, more especially designed for the wheels of agricultural implements, although applicable to machines or vehicles of other kinds.

The invention consists in the features of improvement hereinafter described, illustrated in the accompanying drawings, and particularly pointed out in the claims at the end of this specification.

Figure 1 is a view in side elevation of a part of a vehicle axle and hub embodying my invention. Fig. 2 is a view in vertical longitudinal section through Fig. 1. Fig. 3 is a detail side view of the ball-retainer. Fig. 4 is an enlarged detail view through a portion of a ball-retainer on line 4 4 of Fig. 3.

A designates the axle of the vehicle, and B denotes the hub of the wheel, the spokes $b$ of which are broken away. Upon the axle A and passing through the hub B is the sleeve or box C, that is shown as held in place upon the axle by a cotter-pin 2, passing through the axle and the sleeve. The inner end of the sleeve C is formed with an annular shoulder $c$, that bears against the hub $d$ of the sand-band D, this sand-band being rigidly secured to the axle A by a set-screw 3. The sand-band D is shown as provided with a space or opening $d'$ to receive a stud or rib $c'$, projecting from the hub of the sleeve C, the stud or rib $c'$ serving to prevent turning of the sleeve during the adjustment of parts, as will presently more fully appear. Upon the sleeve C are mounted the cones E E', the cups F F', and intermediate the cones and cups the ball-retaining rings G G'. The cones, the cups, and the ball-retaining rings are set within the recessed or flanged ends $b^5$ of the hub B, as clearly shown in Fig. 2 of the drawings. Each of the cups F F' is provided with a short stud or offset $f$, adapted to enter a notch or seat $b'$ in the adjacent part of the hub B, and thus guard the cup against rotation, and each of the cups F F' is formed with an annular flange $f'$, as shown. The cones E E' are of usual construction, their inner faces being formed with bearings for the balls H. The balls H are held within pockets or open spaces formed in the ball-retaining rings G, and in order to securely retain the balls H within the pockets I prefer to form the pockets as shown in Figs. 3 and 4—that is to say, with contracted portions $g$ at one side of the ring and with projections $g'$ at the opposite side, which projections will be bent over the balls, as shown by dotted lines in Fig. 4, and thus retaining the balls against displacement while permitting them to freely revolve and to bear against bear against the raceways of the cones and cups.

By providing the ball-retaining rings it is necessary to employ a comparatively small number of bearing-balls, and by retaining these balls within the rings all danger of their accidental loss when cleaning or replacing the parts is avoided. The outer portion of the sleeve C is screw-threaded, as at $c^2$, and upon this screw-threaded portion of the sleeve is placed a correspondingly-threaded adjusting-nut K, that is provided with a series of axial arms $k$, forming openings to admit the cotter-pin 2.

The various parts will occupy when in place upon the axle the relative position shown in Figs. 1 and 2 of the drawings. When it is desired to adjust the bearings, the cotter-pin 2 will be removed, and the nut K can then be shifted to the required extent, after which the cotter-pin can be replaced between either of the arms $k$. My purpose in providing the sleeve C with the pin or rib $c'$ engaging the sand-band D is to hold the sleeve against turning when the nut K is being adjusted.

It is obvious that the precise details of construction above set out may be varied without departing from the spirit of the invention.

I do not wish to be understood as claiming the ball-retaining rings G G', nor are these essential to my invention.

Having thus described my invention, what I claim as new, and desire to secure by Letters Patent, is—

1. The combination with an axle, of a sand-band fixed thereto, a sleeve mounted upon said axle and interlocked with said sand-band to guard said sleeve against rotation, a wheel-hub, bearing-balls, cups and cones mounted upon said sleeve and a threaded nut at the outer end of said sleeve whereby the adjustment of the parts can be effected, substantially as described.

2. A ball-bearing for vehicle-wheels comprising the combination of a hub having recessed ends and having the body portion between the end recesses, said body portion being provided with notches or seats that face outwardly, a ball-cup located on each side of the center portion of the hub and provided with a stud to enter the outwardly-facing seat thereof, whereby said cups are interlocked with the hub, a ball-cone on each side of said hub, bearing-balls interposed between said cones and cups, a sleeve extending through said hub and through the bearing-balls and cones, and provided at one end with an annular shoulder and at its opposite end with a screw-thread, and an adjusting screw-nut upon said sleeve for determining the position of the parts, substantially as described.

3. The combination with a perforated axle, of a perforated sleeve mounted thereon and having a shoulder at its free end and threaded at its outer end, a wheel-hub on said axle, ball-bearing cones and cups arranged upon said sleeve and each side of said wheel-hub, a threaded nut upon the outer end of said sleeve, said threaded nut being provided with arms or projections extending outwardly therefrom, and a cotter-pin passing between the projecting arm of said nut and through said perforated sleeve and axle, whereby said pin serves to hold the nut in position upon the sleeve and serves also to hold the sleeve in position upon the axle, substantially as described.

WILLIAM SOBEY.

Witnesses:
HENRY MITCHELL WALLIS,
ROBERT EARL BUSHELL.